Figure 1:
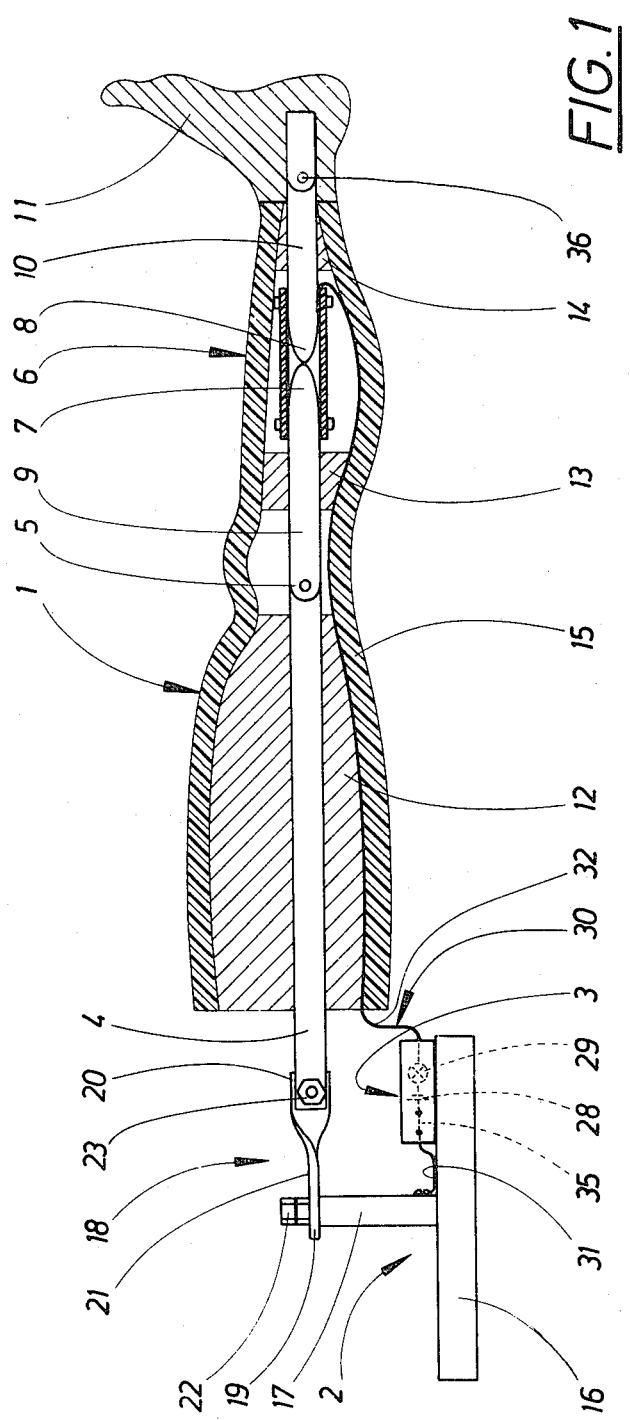

United States Patent [19]

Sandegård

[11] 4,350,490
[45] Sep. 21, 1982

[54] DEVICE FOR USE WHEN TRAINING THE APPROPRIATE HANDLING OF A DISLOCATED INJURY ON A PART OF A BODY

[76] Inventor: Jan D. Sandegård, 830 43 Ås, Sweden

[21] Appl. No.: 193,259

[22] Filed: Oct. 2, 1980

[30] Foreign Application Priority Data

Oct. 4, 1979 [SE] Sweden .................................. 7908218

[51] Int. Cl.³ ............................................. G09B 23/32
[52] U.S. Cl. ...................................... 434/274; 200/161
[58] Field of Search ............... 434/265, 267, 268, 274, 434/275; 200/161

[56] References Cited

U.S. PATENT DOCUMENTS

| | | | |
|---|---|---|---|
| 2,103,021 | 12/1937 | Salsman | 434/274 |
| 2,781,611 | 2/1957 | Bills | 434/267 X |
| 3,109,075 | 10/1963 | Ratcliff | 200/161 X |
| 3,209,469 | 10/1965 | James | 434/265 |
| 3,895,451 | 7/1975 | Smrcka | 434/274 |

*Primary Examiner*—Harland S. Skogquist

[57] ABSTRACT

Device for use when training the appropriate handling of a dislocated injury on a part of the body. The device comprises an artificial imitation of the present part of the body, provided with an artificial injury, dislocating two artificial body portions relative to each other. The two body portions are connected to each other by means of an elastic connecting member and provided to be given a correct location. A signalling device is provided to be activated in order to indicate incorrect relative locations of the two body portions.

2 Claims, 2 Drawing Figures

DEVICE FOR USE WHEN TRAINING THE APPROPRIATE HANDLING OF A DISLOCATED INJURY ON A PART OF A BODY

The present invention relates to a device for use when training the appropriate handling of a dislocated injury on a part of a body.

First aid, when for example extremities are injured, aims at preventing pain in connection with movements and transportation and at reducing the risk of aggravating the injury during the handling of the injured extremity. A stable injury can usually be taken care of without any risk worth mentioning that the injury will be aggravated. However, a dislocated injury involving the dislocation of a part or parts of the body, by way of example a not stabilized condition of an injury, on the contrary requires special care in order to avoid pain and aggravation of the injury.

Pain arises, if the bone ends of a fractured extremity are permitted to rub against each other or are exercising a pressure against surrounding soft body tissues. A pressure against bone ends and soft body tissues can be avoided, if a traction is applied in the longitudinal direction of the extremity. In order to make possible the transportation after a linear adjustment has been made and a certain traction has been applied, a fixation of the injured extremity is required. It is of essential importance that the traction of the extremity is maintained until its position is fixed. The modern ways of fixation require that the extremity is lifted up to a varying extent. The lifting operation requires a traction below the injury, a counter-holding force applied above the injury and a support on the underside of the injury.

Thus, the three steps in connection with the handling of a unstable injury, viz. (1) adjustment into correct alignment, (2) lifting and (3) fixation require traction as a common denominator. A traction force can only be successfully applied to an extremity in unstable condition. Any comprehensive training in the handling of unstabilized conditions of injured extremities can for diverse reasons not take place in actual cases of injuries.

The training in handling injuries of extremities is mostly carried out with the aid of illustration in the form of sketches, photographs, and X-ray pictures. With respect to exercises in the practical handling of these injuries the training is constrained to resort to injured individuals. However, it is not possible to teach the steps essential for the handling of a an injury of dislocated nature, such as unstable condition of an injury to an extremity, using an unbroken leg or arm as the object.

It is an object of the present invention to provide a device, which makes possible high-grade realistic exercises in the handling of a dislocated injury.

Said object is accomplished by means of a device according to the present invention, comprising an artificial imitation of said part of the body, provided with an artificial injury dislocating a first artificial body portion relative to a second artificial body portion of said part, said first and second body portions being connected to each other by means of elastic connecting means provided to establish a correct relative location and between said parts and further comprising signalling means provided with detecting means for detecting the relative location of the first and second body portions, and with indicating means, connected to the detecting means and provided to be activated by the detecting means and to indicate incorrect relative locations of the first and second body portions.

The invention will now be described more in detail by means of an example of a preferred embodiment, reference being made to the accompanying drawings, in which FIG. 1 shows a longitudinal cross section through a device according to the invention in a condition, wherein no pulling force has been applied, while FIG. 2 on an enlarged scale shows a partial view of the device according to the invention, when a traction force has been applied.

The training device according to the invention comprises substantially an artificial leg 1, an anchoring part 2, to which the artificial leg is articulated, and a signalling means 3. The artificial leg 1 is designed with an artificially caused bone fracture, the signalling means being arranged to give a signal, when the parts, which correspond to the ends of fractured bones, are in contact with each other, which condition is avoided initially for training purposes.

For this purpose the artificial leg of the illustrated example comprises core 4 of long extension, which is comparatively stiff and electrically conductive. The core 4 is therefore suitably made of a metallic material, by way of example in a form of a metal tube or a round bar. The core 4 is intended to correspond to the skeleton parts of the artificial leg 1 and is therefore provided with an articulation 5, which is intended to form the knee-joint.

At the artificial fracture 6 below the knee-point the core 4 is split to provide two end portions 7, 8, which in the position according to FIG. 1 are in contact with each other. In the position illustrated in FIG. 1 the leg is not subjected to any pulling force, the two end portions 7, 8 being kept in contact with each other as a result of imagined muscle forces in the leg, which operate around the point of fracture 6. Thus, the core 4 as a result of the fracture is divided into an upper portion 9, located above the point of fracture and connected with the anchoring part 2, and a lower portion 10 extending downwards into the foot 11. The lower portion 10 of the core is provided with an artificial ankle-joint 36.

The core 4 is at least as regards certain sections of the leg 1 surrounded by body forming parts 12, 13, 14, which can be made of easily molded plastic material and are intended to provide the leg with a natural shape. Two body-halves can be arranged around the fracture point 6, which for the sake of perspicuity are not shown in the drawings. The body-halves in question can be detachable from the core 4 and split up in the longitudinal direction of the core and by way of example be made to permit being screwed together, so that the point of fracture can be exposed for inspection in a simple manner. The artificial leg 1 is enclosed in an envelope 15, which by way of example is made of plastic foam or the like in order to imitate adipose tissue and skin and makes possible an adaptation of its movement to any movement around knee-joint 5 and ankle-joint 36 and at the artificial fracture 6. However, the envelope can suitably be opened right in front of the point of fracture 6, by way of example by means of a slit or similar. A stocking can be drawn on to the leg along the whole of its length outside of the envelope 15 and the foot 11, which by way of example is made of an easily molded plastic material.

In the illustrated example the anchoring part 2 comprises a supporting plate 16, an upright 17, which projects from the supporting plate, and a double joint 18, by means of which the core of the leg 1 is articulated to the upright 17. The double joint 18 comprises two joint parts 19, 20, of which one joint part 19 makes possible articulation round an upright shaft 17, whereas the joint part 20 is pivoted on a horizontal shaft (core 4). The double joint parts are connected by an intermediate component 21, which is bent in such a manner that its ends are occupying a position at an angle of 90° relative to each other. Each one of the ends is provided with a bore, through which a screw, a threaded pin or the like is extending, on which nuts 22, 23 are mounted and locked in such a manner that movability of both of the articulated ends is obtained. One of the screws projects in upwards direction outside of the upright 17, which in its top portion is provided with a shoulder, on which the end 19 of the intermediate component 21 belonging thereto can rest. By means of the double joint 18 a free and comparatively lifelike movability of the artificial leg 1 is obtained, which thus can be made to point in a desired direction relative to the anchoring part 2. By way of example the leg can rest on a foundation, not shown, which in the illustrated example is somewhat raised relative to the foundation, on which the supporting plate 16 is resting, by which arrangement the leg can be maintained in linear alignment. If there is a common support with the same level for the supporting plate 16 as well as the leg 1, the leg will incline towards the foundation, and especially the one portion of the leg, which is below the point of facture 6, will occupy a position deviating from the longitudinal direction of the rest of the leg, before the "injury" is attended to.

Figure 2:
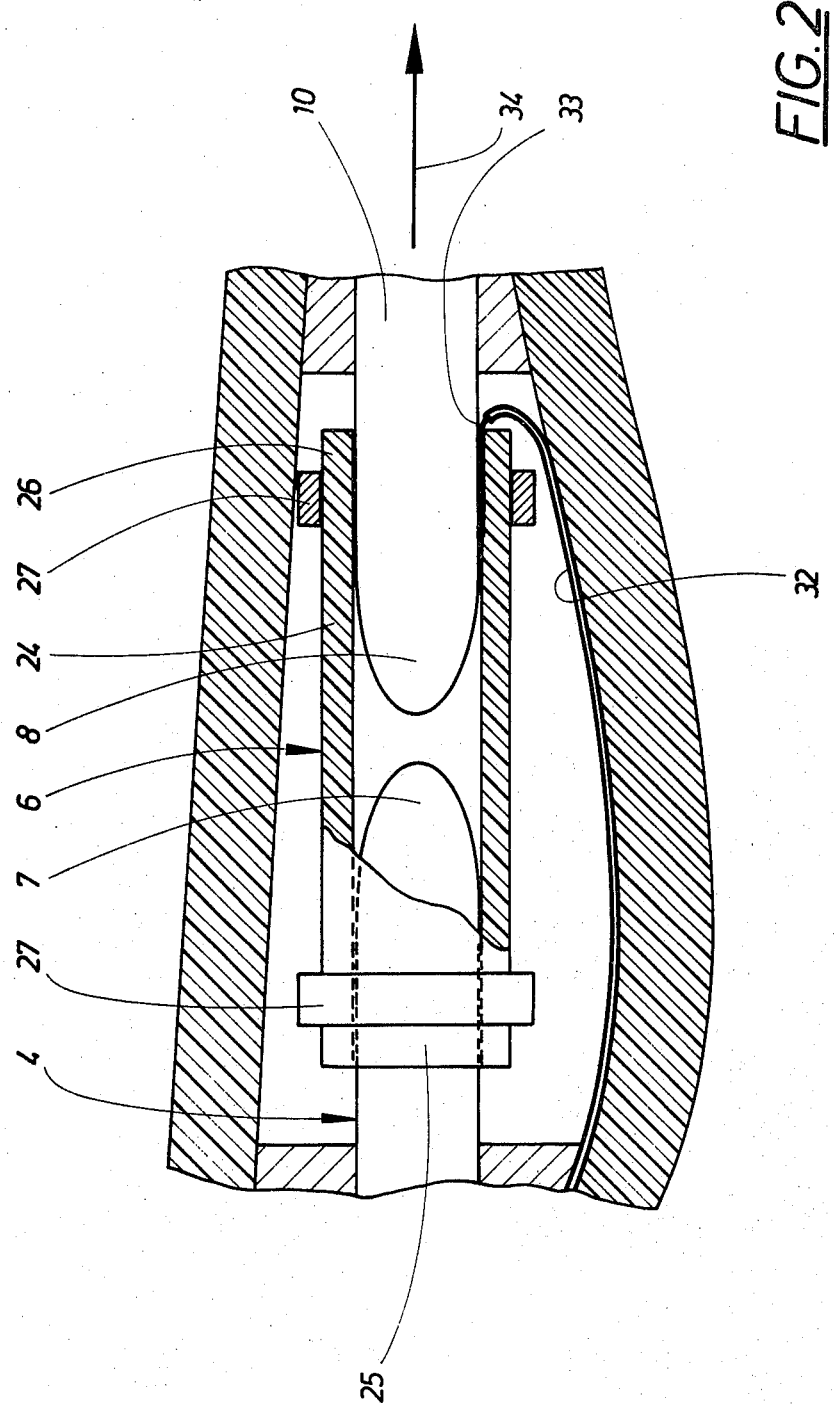

The artificial fracture 6, which is best illustrated in FIG. 2 is according to the invention provided with resilient means 24, which tend to contract the artificial fracture 6, i.e. to move together the end portion 8 of the lower part 10 with the end portion 7 of the upper part 9. In the illustrated example this can be performed by said resilient means 24 comprising a resilient hose, by way of example a rubber hose, which is threaded over both the end portions 7, 8 of the core 4. The resilient hose 24 is clamped to the core by means of hose clamps 27. The hose clamps can be of an entirely conventional type and be provided with a screw, which tends to hold together the clamp and consequently also to hold the hose. The resilient hose 24 is suitably pretensioned, i.e. clamped in a somewhat extended condition in such a manner that when it is is secured the hose constantly tends to move the two end portions 7, 8 towards each other. The resiliency of the hose 24 is so chosen that the fracture, which in a natural leg is counteracted by means of its muscles, is imitated to the greatest possible extent. A suitable resiliency is obtained by chosing a suitable kind of material for the hose 24, an adequate thickness of the same and the proper distance between the clamps 27, and also a suitable pretensioning for the starting condition with the end portions 7, 8 in contact with each other as shown in FIG. 1. When tubular material is used, a suitable form of the end portions 7, 8 is obtained by cutting out a number of flaps and bending the same inwards. When a solid core 4 is used, such as a round bar, it is for example conically shaped at the end portions 7, 8. The envelope 15 can thus be designed in such a manner that its influence on the movability of the leg at the point of fracture 6 will be insignificant, the movability then substantially being determined by the resilient hose 24.

The signalling means 3 according to the invention comprises a source of current supply 28, a signalling member 29 in the form of a light bulb, a buzzer or similar indicating means, and an electric circuit 30, which is arranged to alternatively close or switch off an electric current between the source of current 28 and the signalling member 29. The source of current supply can for example comprise a drycell, an accumulator or a connection to an existing electric main circuit via a transformer, which reduces the tension to a suitable level, by way of example 24 volts or less. Thus, the basic idea involves the alternative closing and switching off, when a contact is established between the two end portions 7, 8 of the core 4, i.e. the position illustrated in FIG. 1, or when such a contact between the end portions 7, 8 ceases to exist, i.e. in the position illustrated in FIG. 2. This is brought about by the source of current 28 with one terminal being electrically connected via a circuit 31, the upright 17, the intermediate part 21, the core 4 to its end portion 7, whereas the signalling member 29 on one side is connected with the other terminal of the source of current 28 and on its other side via a suitable insulated circuit 32 is connected with the lower portion 10 of the core 4. The circuit 32 is in the illustrated example placed between the body parts 12, 13 and the envelope 15 and is at one of its ends 33 in electric contact with the lower portion 10 of the core by exposure of the end of the circuit and clamping said end between the resilient hose 24 and the clamp 27 belonging thereto.

The function of the simulator is evident, and it can thus be utilized in connection with training in the handling of injuries at extremities of the type such as a broken leg. As was mentioned above, it is of very essential importance that one avoids that the ends of the bones in a bone fracture contact each other, as this produces great pain and can aggrevate the injury. Thus, the simulator functions in such a manner that a signal is emitted by the signalling member 29 as soon as the above mentioned undesired condition arises, which should be avoided. This is arranged by a suitable traction force being applied below the point of fracture 6, the lower portion 10 of the core 4 being brought in the direction indicated by the arrow 34 and kept in such a position during the whole handling operation while a signal is not emitted. By means of the resilient hose 24 the bone ends 7, 8 tend to arrive in contact with each other, which as explained cannot be permitted, an incorrect handling immediately resulting in a signal emitted by the signal means. When the device is not in use, the current circuit is switched off by means of a switch 35, which is cut in between the source of current 28 and the circuit 31 in the illustrated example.

The invention is not limited to the example of the embodiment described above and illustrated on the drawings, but can be varied within the scope of the following claims. For example, other artificial parts of a body can be simulated in the device. It is also possible to incorporate the simulator into a doll, which is utilized for other training purposes, by way of example lifesaving. Other parts of the body which may be simulated are the arms, and also injuries to other parts of the body than the very extremity parts can be simulated such as injuries to the shoulders, a common feature being that the simulator comprises one or several artificial body parts, which are provided with an imitation injury of a dislocated type, and the signal means being activated as soon as an incorrect handling of the dislocating injury occurs otherwise accompanied by pain or an aggravation of the injury in a real case. It is conceivable that other kinds of signalling means may be utilized. It is also contemplated to utilize a circuit in the form of light guides, light emittig diodes with light detectors, an electromagnetic field or, a pneumatic system. It is further contemplated that the core 4 in itself is not electrically conductive or utilized as a conductor, the electric circuit then including special circuits, which lead to the end portions 7, 8, which latter ones, however, are electrically conductive. The double joint 18 can be substituted by any other other joint, preferably resulting in a free articulating function, as for example a flexible hose of plastic material or rubber, which can be threaded on for one thing the core and for another thing the upright. This joint can as an alternative comprise a ball joint.

I claim:

1. A device for use in training personnel for handling a fracture injury in bones of a body comprising a simulation of a part of the body provided with a simulated fracture separating a first body portion relative to a second body portion of said part, said first and second body portions being connected to each other by means of elastic connecting means to relocate the same in a normal position with respect to each other, detecting means for detecting relative location of the first and second body portions, indicating means connected to the detecting means and activated by the detecting means to indicate incorrect relative locations of the first and second body portions, said first and second artificial body portions including respectively first and second artificial portions of a fractured skeleton bone, said elastic means urging said artificial bone portions toward each other and comprising an elastic hose which is threaded onto one end of each of said artificial bone portions, said ends of the bone portions being said detecting means, which are electrically conductive and arranged to activate the indicating means and produce a signal upon establishing an electrical contact between said two ends of the bone portions thus indicating an incorrect location, said indicating means comprising an electrical current source and an electrical circuit connecting the same to said detecting means, said electrical circuit being adapted to be closed upon electrical and mechanical contact between said two ends of the artificial bone members resulting in activation of the indicating means, thereby designating an incorrect location, and to be interrupted when said ends of the bone portions are not in contact thereby resulting in an inactive condition of the indicating means showing that an improper positioning the artificial bone members has not occurred.

2. The device of claim 1 wherein said body is a simulated limb of a human body.

* * * * *